US010533751B2

(12) United States Patent
Kolvick et al.

(10) Patent No.: US 10,533,751 B2
(45) Date of Patent: Jan. 14, 2020

(54) COMBUSTION CAN MAINTENANCE APPARATUS AND METHOD

(71) Applicant: General Electric Company, Schenectady, NY (US)

(72) Inventors: Sandra Beverly Kolvick, Simpsonville, SC (US); Adrien Francis Bigotte, Raismes Nord (FR); Adrian Adam Klejc, Siedlce (PL); Bernard Finbar Shannon, Larne (GB)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 15/882,082

(22) Filed: Jan. 29, 2018

(65) Prior Publication Data

US 2018/0216829 A1    Aug. 2, 2018

(30) Foreign Application Priority Data

Jan. 27, 2017   (EP) ..................... 17461506

(51) Int. Cl.
*F23R 3/60* (2006.01)
*F23R 3/46* (2006.01)
(Continued)

(52) U.S. Cl.
CPC ................ *F23R 3/60* (2013.01); *F01D 9/023* (2013.01); *F02C 3/04* (2013.01); *F23R 3/46* (2013.01);
(Continued)

(58) Field of Classification Search
CPC ...... F23R 3/60; F23R 3/42; F23R 3/44; F23R 3/46; F23R 2900/00019; F02C 3/04; F05D 2230/64; F05D 2230/642; F05D 2230/644

See application file for complete search history.

(56) References Cited

U.S. PATENT DOCUMENTS 2,229,256 A    1/1941   Pfauser et al.
2,432,487 A    12/1947  Paxman
(Continued)

FOREIGN PATENT DOCUMENTS

CN    103101022 A    5/2013
WO    2015/121009 A1    8/2015

OTHER PUBLICATIONS

Extended European Search Report and Opinion issued in connection with corresponding EP Application No. 17461506.2 dated Jul. 31, 2017.

*Primary Examiner* — Carlos A Rivera
(74) *Attorney, Agent, or Firm* — Charlotte C. Wilson; James W. Pemrick

(57) ABSTRACT

Various embodiments include apparatuses for performing maintenance on a gas turbine (GT) combustion can, along with related methods. One apparatus can include: a mounting plate having at least two fasteners extending therethrough, the mounting plate configured to engage a fixed combustion chamber in the GT; a can adjustment bar configured to engage the can combustor, the can adjustment bar including a set of apertures extending therethrough; a set of guide pins extending through the set of apertures in the can adjustment bar and coupled with the mounting plate, the set of guide pins connecting the mounting plate with the can adjustment bar; and an adjustment member extending between the can adjustment bar and the mounting plate, the adjustment member configured to modify a position of the can adjustment bar relative to the mounting plate.

19 Claims, 2 Drawing Sheets

(51) Int. Cl.
*F02C 3/04* (2006.01)
*F01D 9/02* (2006.01)

(52) U.S. Cl.
CPC ...... *F05D 2220/32* (2013.01); *F05D 2230/64* (2013.01); *F05D 2230/642* (2013.01); *F05D 2230/644* (2013.01); *F05D 2240/35* (2013.01); *F05D 2260/31* (2013.01); *F23R 2900/00019* (2013.01)

(56) References Cited

U.S. PATENT DOCUMENTS

| | | |
|---|---|---|
| 3,628,884 A | 12/1971 | Mierley et al. |
| 4,520,735 A | 6/1985 | Field |
| 7,114,922 B2 | 10/2006 | Tomko et al. |
| 8,181,555 B2 | 5/2012 | Clements et al. |
| 8,276,253 B2 | 10/2012 | Herbold et al. |
| 8,528,181 B2 | 9/2013 | Maurell et al. |
| 9,038,253 B2 | 5/2015 | Herbold et al. |
| 9,144,866 B2 * | 9/2015 | Holmes ............. F01D 9/023 |
| 9,200,565 B2 | 12/2015 | Myers et al. |
| 2007/0220728 A1 | 9/2007 | Bosche et al. |
| 2009/0236573 A1 | 9/2009 | Hu |
| 2012/0233845 A1* | 9/2012 | Gerengi ............. F01D 25/28 |
| | | 29/466 |
| 2013/0139368 A1* | 6/2013 | Iseki ............... F01D 25/285 |
| | | 29/281.4 |
| 2014/0165397 A1 | 6/2014 | Holmes et al. |
| 2015/0336222 A1 | 11/2015 | Aratori et al. |
| 2016/0312705 A1* | 10/2016 | Corradi ............ F01D 25/285 |
| 2017/0167297 A1* | 6/2017 | Merlau ............. F01D 25/28 |
| 2018/0156071 A1* | 6/2018 | Mogle, II .......... F01D 25/285 |
| 2018/0306064 A1* | 10/2018 | Kolvick ............ F01D 25/285 |

\* cited by examiner

COMBUSTION CAN MAINTENANCE APPARATUS AND METHOD

TECHNICAL FIELD

The subject matter disclosed herein relates to turbomachines. More particularly, the subject matter relates to gas turbomachines and associated maintenance apparatuses.

BACKGROUND

Conventional gas turbines generally include three sections: a compressor section, a combustor section and a turbine section. The compressor section compresses ambient air, and provides that compressed air to the combustion section where it is combined with fuel to generate a heated working fluid (gas). The heated gas is provided to the turbine section, where it impacts turbine blades to drive rotation of the turbine rotor shaft.

The combustion section often includes a number of can combustors in which combustion fluids such as air, fuel and diluents are mixed and combusted. In some combustion systems, the can combustors are uniquely angled with respect to the machine centerline (axis of rotation of the compressor and turbine section), and as such, performing maintenance on those can combustors creates an engineering challenge. For example, if a can combustor is not removed squarely from the combustion system, the can components as well as the remaining combustion hardware can be damaged.

BRIEF DESCRIPTION

Various embodiments include apparatuses for performing maintenance on a gas turbine (GT) combustion can, along with related methods. A first aspect of the disclosure includes an apparatus having: a mounting plate having at least two fasteners extending therethrough, the mounting plate configured to engage a fixed combustion chamber in the GT; a can adjustment bar configured to engage the can combustor, the can adjustment bar including a set of apertures extending therethrough; a set of guide pins extending through the set of apertures in the can adjustment bar and coupled with the mounting plate, the set of guide pins connecting the mounting plate with the can adjustment bar; and an adjustment member extending between the can adjustment bar and the mounting plate, the adjustment member configured to modify a position of the can adjustment bar relative to the mounting plate.

A second aspect of the disclosure includes a method of performing maintenance on a can combustor of a gas turbine (GT), the method including: mounting a can combustor maintenance apparatus on the can combustor, the can combustor maintenance apparatus including: a mounting plate having at least two fasteners extending therethrough, the mounting plate configured to engage a fixed combustion chamber in the GT; a can adjustment bar configured to engage the can combustor, the can adjustment bar including a set of apertures extending therethrough; a set of guide pins extending through the set of apertures in the can adjustment bar and coupled with the mounting plate, the set of guide pins connecting the mounting plate with the can adjustment bar; and an adjustment member extending between the can adjustment bar and the mounting plate; and actuating the adjustment member to modify a position of the can adjustment bar relative to the mounting plate.

A third aspect of the disclosure includes a non-transitory computer readable storage medium storing code representative of a maintenance apparatus for a can combustor of a gas turbine (GT), the maintenance apparatus physically generated upon execution of the code by a computerized additive manufacturing system, the code including: code representing the maintenance apparatus, the maintenance apparatus including: a mounting plate having at least two fasteners extending therethrough, the mounting plate configured to engage a fixed combustion chamber in the GT; a can adjustment bar configured to engage the can combustor, the can adjustment bar including a set of apertures extending therethrough; a set of guide pins extending through the set of apertures in the can adjustment bar and coupled with the mounting plate, the set of guide pins connecting the mounting plate with the can adjustment bar; and an adjustment member extending between the can adjustment bar and the mounting plate, the adjustment member configured to modify a position of the can adjustment bar relative to the mounting plate.

BRIEF DESCRIPTION OF THE DRAWINGS

These and other features of this disclosure will be more readily understood from the following detailed description of the various aspects of the invention taken in conjunction with the accompanying drawings that depict various embodiments of the invention, in which.

Figure 1:
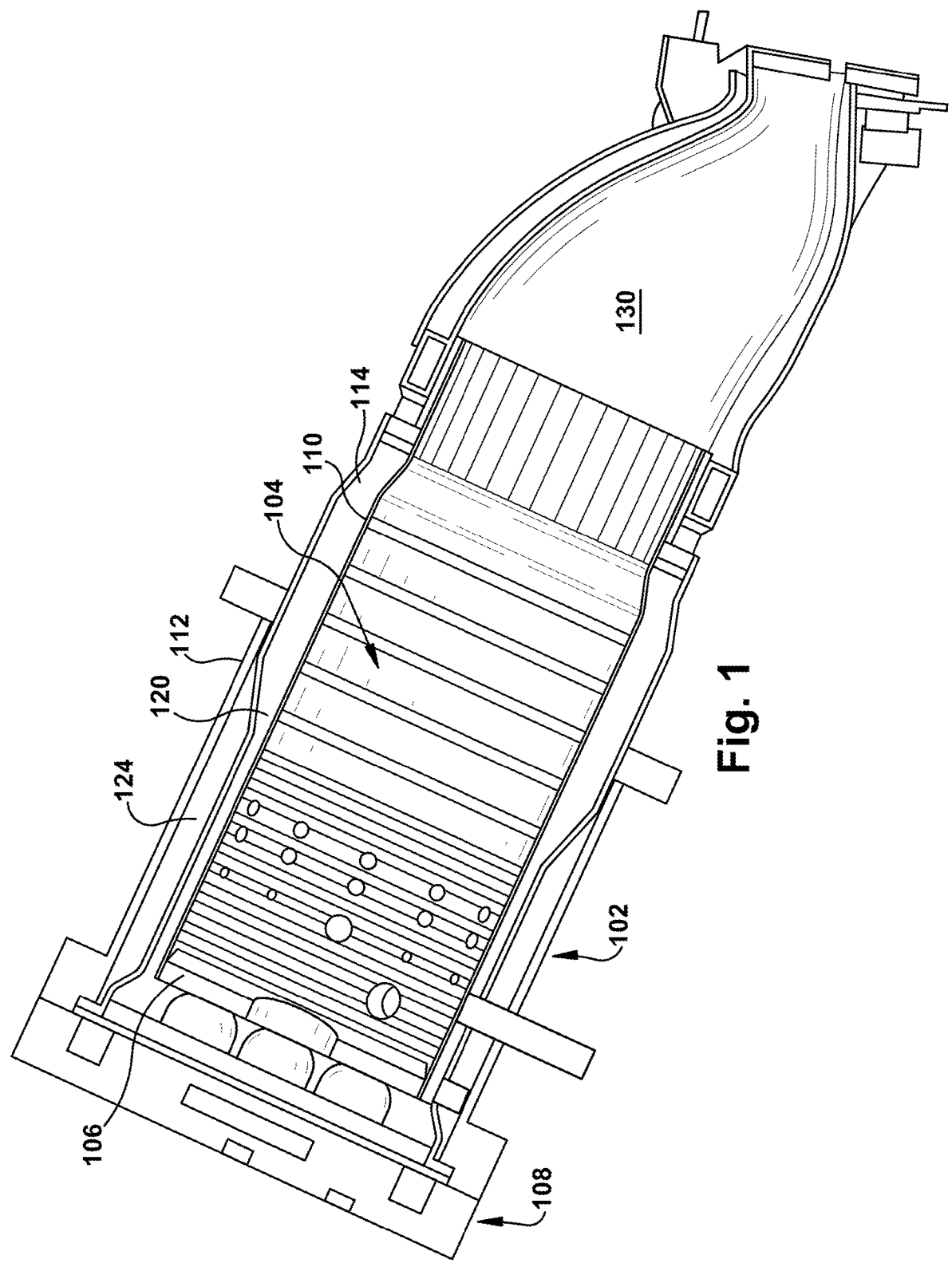
FIG. 1 shows a schematic cut-away view of section of a gas turbine according to various embodiments of the disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As described herein, the subject matter disclosed according to various embodiments relates to turbomachines (or simply, turbines). More particularly, the subject matter relates to gas turbines and associated maintenance apparatuses for combustion cans.

As noted herein, if a can combustor is not removed squarely from the combustion system, the can components as well as the remaining combustion hardware can be damaged. This issue can be particularly relevant in newer combustion systems that do not include built-in hardware for removing and/or replacing combustor cans. For example, in some newer combustion systems the can combustor does not include bolt holes for accommodating a jack with which to lift the can. This situation can complicate the process of removing and/or installing each can combustor around the combustion system. According to various embodiments of the disclosure, an apparatus and related method are configured to effectively perform maintenance (e.g., removal and/or installation) of a can combustor in a combustion system. The maintenance apparatus disclosed according to various embodiments allows for efficient maintenance on a set (one or more) of can combustors, each oriented at distinct angles from the primary combustion chamber, without damaging those can combustors.

Now referring to the drawings, FIG. 1 shows a cross-sectional view of one can combustor of a combustor system 100 for, e.g., a gas turbine engine (not shown). As understood, combustor system 100 may include, among other things, a plurality of can combustors 102 each including a combustion chamber 104 for accommodating combustion of a plurality of combustion fluids therein into a combustion flow. Can combustors 102 are typically situated in a circular manner about a combustion flow path (not shown) that feeds to, for example, a gas turbine engine. Each can combustor 102 may include a combustor end cover 106 incorporated into a combustor assembly 108. Combustor end cover 106 in accordance with illustrative embodiments of the disclosure can be incorporated into combustor assembly 108 with varying configurations and should not be limited to the configuration shown in FIG. 1. Each can combustor 102 may include combustion chamber 104 defined, at least in part, by a combustor liner 110 disposed within a casing 112. A flow sleeve 114 may be mounted within casing 112 and surrounding combustor liner 110. Within combustor casing 112, flow sleeve 114 is spaced a distance outward from combustor liner 110. A space between flow sleeve 114 and combustor liner 110 forms a portion of a chamber 120 receiving an air flow from a system compressor (not shown). In addition, a space between flow sleeve 114 and casing 112 forms a portion of a chamber 124 receiving an air flow, e.g., air collected after impingement cooling of other parts of can combustor 102. In one embodiment, air within chamber 120 may be pressurized air from a compressor discharge (not shown).

Figure 2:
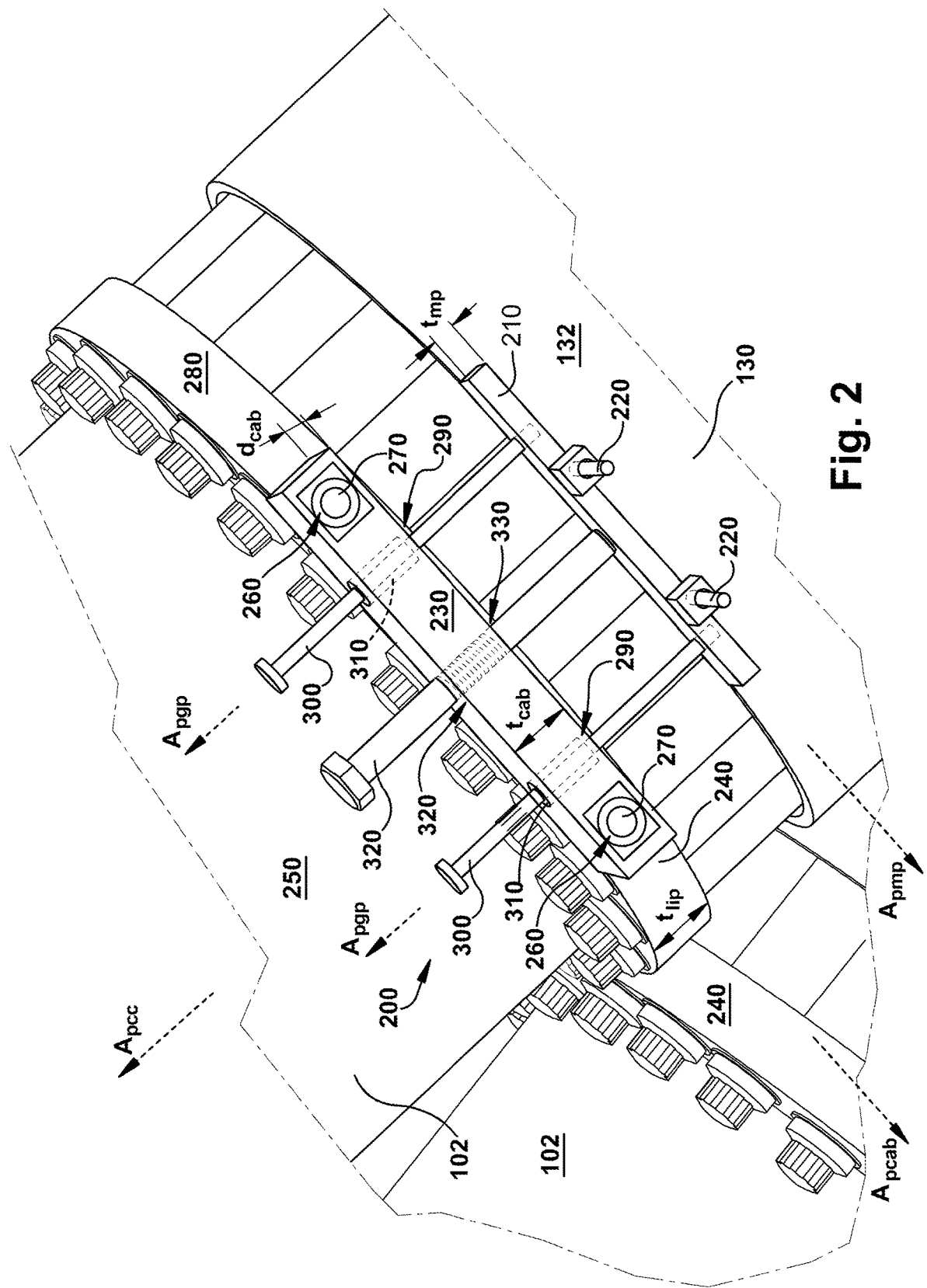
FIG. 2 shows a perspective view of a maintenance apparatus along with the gas turbine of FIG. 1, according to various embodiments of the disclosure.

FIG. 2 shows a close-up perspective view of a can combustor 102 and a combustor can maintenance apparatus 200 according to various embodiments. As used herein, the term "maintenance" can include installation, removal, rehabilitation, evaluation, or any other form of manipulation conventionally referred to in the art. That is, combustor can maintenance apparatus 200 shown in FIG. 2 is configured to perform maintenance on can combustor 102 within, or being installed within a gas turbine (FIG. 1). In some cases, combustor can maintenance apparatus 200 is configured to aid in removal of one or more can combustor(s) 102 within a gas turbine.

As shown in FIG. 2, can combustor 102 is coupled with a fixed combustion chamber 130. In some cases, can combustor 102 may be bolted, screwed, fastened, welded, brazed or otherwise joined with fixed combustion chamber 130. It is understood that can combustor 102 represents one can combustor 102, which may be one of a plurality of can combustors 102 positioned around a central chamber. In various embodiments, can combustor maintenance apparatus 200 and its components are formed of a metal (e.g., steel, titanium, aluminum), alloy(s), or other composite material capable of withstanding the mechanical stresses associated with the functions described herein. In some cases, can combustor maintenance apparatus 200 includes components formed integrally (e.g., via casting, additive manufacturing, etc.) and/or formed separately and subsequently coupled (e.g., via mechanical fastening, bolting, clamping, etc.).

As shown in FIG. 2, combustor can maintenance apparatus (or simply, maintenance apparatus) 200 is configured to perform maintenance on one or more can combustor(s) 102 in a gas turbine (not shown). Maintenance apparatus 200 can include a mounting plate 210 having at least two fasteners 220 extending therethrough, where mounting plate 210 is configured (e.g., sized and/or shaped) to engage fixed combustion chamber 130. That is, in some cases, mounting plate 210 is sized to fit flush with, or substantially flush with, an outer surface of combustion chamber 130. In various embodiments, fasteners 220 extend entirely through mounting plate 210 in order to fasten mounting plate 210 with fixed combustion chamber 130. In some cases, fasteners 220 include adjustable set screws, which may be mated with pre-formed apertures in combustion chamber 130, or in apertures formed specifically for coupling maintenance apparatus 200 with combustion chamber 130. In other cases, fasteners 220 can include magnets, bolts, threaded fasteners, latch pins (e.g., spring-loaded latch pins), or any other suitable fastening device. In some cases, fasteners 220 do not extend into fixed combustion chamber 130, but are retained against fixed combustion chamber by a glue or other adhesive (e.g., cyanoarcylates or similar adhesive). According to some embodiments, more than two fasteners 220 are used to fasten mounting plate 210 to combustion chamber 130. However, given the force required to manipulate can combustor 102, fewer than two fasteners 220 may make apparatus 200 unstable. As such, in various embodiments, at least two fasteners 220 are used to fasten mounting plate 210 to combustion chamber 130. According to some embodiments, the at least two fasteners 220 are positioned to engage a radially outward facing surface 132 of fixed combustion chamber 130.

FIG. 2 also shows maintenance apparatus 200 including a can adjustment bar 230 configured (e.g., sized and/or shaped) to engage can combustor 102. In some cases, can adjustment bar 230 is configured to engage a lip 240 on can combustor 102. As shown, lip 240 can protrude axially (relative to primary axis ($A_{pcc}$)) from a body 250 of can combustor 102. In some other embodiments, can adjustment bar 230 is configured to engage body 250, e.g., surface of body 250 in order to perform maintenance according to various approaches described herein. Can adjustment bar 230 can include a set of holes 260 extending therethrough (e.g., entirely therethrough) for receive a set of coupling members 270, each coupling member 270 extending through a hole 260 in the set of holes 260, and coupling can adjustment bar 230 to can combustor 102, e.g., at lip 240 or body 250. Coupling members 270 can include bolts in some cases. In other cases, coupling member 270 can include screws, fasteners, pins, retaining springs or other known devices capable of coupling can adjustment bar 230 with lip 240 or body 250. In various embodiments, can adjustment bar 230 is configured (sized, shaped) to engage a radially outward facing surface 280 (relative to primary axis ($A_{pcc}$) of lip 240, e.g., to fit flush with or substantially flush with outward facing surface 280. That is, in some cases, can adjustment bar 230 has a thickness ($t_{cab}$) that is approximately (e.g., within 1-3%) equal to a thickness ($t_{lip}$) of the lip 240 along outward facing surface 280. In particular cases, can adjustment bar 230 has a thickness ($t_{cab}$) approximately two times (2×) to approximately ten times (10×) a thickness ($t_{mp}$) of mounting plate 210, as measured along the primary axis ($A_{pcc}$) of can combustor 102 (which is substantially parallel with a primary axis ($A_{pgp}$) of further-described guide pins). In some embodiments, can adjustment bar 230 has a primary axis ($A_{pcab}$) that is parallel (or approximately parallel) with a primary axis ($A_{pmp}$) of mounting plate 210, and a depth ($d_{cab}$) that is approximately two times (2×) to approximately five times (5×) a depth ($d_{mp}$) of mounting plate 210 as measured in a direction perpendicular to their primary axes ($A_{pcab}$ and $A_{pmp}$). It is understood that this approximately parallel relationship between mounting plate 210 and can adjustment bar 230 can exist where mounting plate 210 and can adjustment bar 230 have some form of curvature or arc in order to effectively mate with the curved surfaces of body 250 or radially outward facing surface 132 of fixed combustion chamber 130. Can adjustment bar 230 can further include a set of apertures 290 extending therethrough (spanning thickness ($t_{cab}$)), described further herein.

Also shown in FIG. 2, maintenance apparatus 200 can also include a set of guide pins 300, each pin 300 extending through an aperture 290 in can adjustment bar 230. Guide pins 300 are additionally coupled with mounting plate 210, and may in some cases be welded, cast, fastened, adhered or otherwise joined with mounting plate 210. Guide pins 300 may be coupled with mounting plate 210 in a fixed manner, such that guide pins 300 and mounting plate 210 are not configured to move relative to one another. In various embodiments, guide pins 300 connect mounting plate 210 with can adjustment bar 230. In some cases, each guide pin 300 in the set of guide pins 300 extends through a corresponding aperture 290 in the set of apertures 290. Guide pins 300 can be positioned to limit lateral movement of can adjustment bar 230 relative to mounting plate 210, e.g., with respect to their primary axes ($A_{pcab}$ and $A_{pmp}$) and/or the primary axis ($A_{pcc}$)) of can combustor 102. Maintenance apparatus 200 can also include a set of bushings or bearings 310 each located within an aperture 290 in can adjustment bar 230. Bushings or bearings 310 can permit movement of can adjustment bar 230 along guide pins 300, e.g., along primary axis ($A_{pgp}$) of guide pins 300. In some cases, bearing 310 can include a linear guide bearing.

Maintenance apparatus 200 can further include an adjustment member 320 extending between can adjustment bar 230 and mounting plate 210. Adjustment member 320 is configured to modify a position of can adjustment bar 230 relative to mounting plate 210. In some embodiments, adjustment member 320 includes a jack bolt, which may be configured to move can adjustment bar 230 up or down relative to mounting plate 210. In these cases, jack bolt can include a set of notches, and an operator (e.g., human and/or robotic operator) may actuate the jack bolt (e.g., by hammering, rotating, etc.), and move that jack bolt relative to can adjustment bar 230. Notches in the jack bolt may prevent the can adjustment bar 230 from receding after actuating the jack bolt. In other cases, adjustment member 320 can include a manual jack or a hydraulic jack, configured to move can adjustment bar 230 relative to mounting plate 210. In various embodiments, where adjustment member 320 includes a jack bolt, can adjustment bar 230 can include an internally threaded slot 330 for receiving adjustment member 320. That is, internally threaded slot 330 can be sized to receive the jack bolt extending therethrough, where the jack bolt is configured to threadably interact (e.g., rotate) within internally threaded slot 330 and apply a force to mounting plate 210 in order to displace can adjustment bar 230 relative to mounting plate 210.

According to various embodiments, maintenance apparatus 200 may be used in a method of performing maintenance on one or more can combustors 102 (FIG. 1, FIG. 2). The processes in the method can apply to some of the apparatuses and components shown and described with reference to FIG. 1 and FIG. 2, however, these processes are not intended to be limited to those particular components shown and described with reference to those Figures. Additionally, processes may be omitted, added or otherwise reordered according to various embodiments. In some embodiments, this process includes:

Process P1: mounting can combustor maintenance apparatus 200 on can combustor 102. In various embodiments, this includes mounting maintenance apparatus 200 on combustion chamber 130 as well. As discussed herein, mounting maintenance apparatus 200 on combustion chamber 130 can include actuating (e.g., screwing or otherwise manipulating) fasteners 220 to engage a surface of combustion chamber 130, and couple mounting plate 210 to that combustion chamber 130. Additionally, this process can include screwing, bolting, or otherwise coupling can adjustment bar 230 to can combustor 102 (e.g., at lip 240 or at surface of body 250), with coupling member 270. As noted herein, where the at least two fasteners 220 include adjustable set screws, mounting maintenance apparatus 200 on can combustor 102 can include screwing the adjustable set screws into fixed combustion chamber 130.

Process P2: after mounting maintenance apparatus 200 on can combustor 102 and combustion chamber 130, this process can include actuating adjustment member 320 to modify a position of can adjustment bar 230 relative to mounting plate 210. In some cases, this can include rotating, jacking, or otherwise forcing adjustment member 320 to displace mounting plate 210 relative to can adjustment bar, and consequently, move (or, displace) can combustor 102 relative to combustion chamber 130. Adjustment member 320 can be actuated to move can combustor 102 away from combustion chamber 130, in the case of removal and/or maintenance of can combustor 102, or to move can combustor toward 102 toward combustion chamber 130, in the case of installation and/or maintenance. In some cases, as noted herein, where adjustment member 320 includes a jack bolt (e.g., as shown in FIG. 2), and can adjustment bar 230 includes internally threaded slot 330 for receiving adjustment member 320, actuating adjustment member 320 can include rotating the jack bolt within internally threaded slot 330 and applying a force to mounting plate 210 in order to displace can adjustment bar 230 relative to mounting plate 210. In various embodiments, guide pins 300 limit lateral movement of can adjustment bar 230 relative to mounting plate 210 during the actuating of adjustment member 320. Further, bushings or bearings 310 each located within an aperture 290 in the can adjustment bar 230 can permit movement of can adjustment bar 230 along the set of guide pins 300 during the actuating of adjustment member 320.

It is understood that the processes described herein may omit ancillary processes, such as removing bolts or other couplings (e.g., welds, braze joints, etc.) which couple can combustor 102 and combustion chamber 130, prior actuating adjustment member 320.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus for performing maintenance on a can combustor of a gas turbine (GT), the apparatus comprising:
 a mounting plate having at least two fasteners extending through the mounting plate and a radially outer facing surface of a fixed combustion chamber, the mounting plate configured to engage the fixed combustion chamber in the GT;

a can adjustment bar configured to engage the can combustor, the can adjustment bar including a set of apertures extending therethrough;

a set of guide pins extending through the set of apertures in the can adjustment bar and coupled with the mounting plate, the set of guide pins connecting the mounting plate with the can adjustment bar; and an adjustment member extending between the can adjustment bar and the mounting plate, the adjustment member configured to modify a position of the can adjustment bar relative to the mounting plate.

2. The apparatus of claim 1, wherein the adjustment member includes a jack bolt.

3. The apparatus of claim 2, wherein the can adjustment bar includes an internally threaded slot, the jack bolt extending through the internally threaded slot, the jack bolt configured to rotate within the internally threaded slot and apply a force to the mounting plate to displace the can adjustment bar relative to the mounting plate.

4. The apparatus of claim 1, wherein the at least two fasteners include adjustable set screws or magnets.

5. The apparatus of claim 1, wherein the adjustment member includes a manual jack or a hydraulic jack.

6. The apparatus of claim 1, wherein each guide pin in the set of guide pins extends through a corresponding one of the apertures in the can adjustment bar.

7. The apparatus of claim 1, wherein the can adjustment bar is sized to engage a radially outward facing surface of a lip of the can combustor.

8. The apparatus of claim 1, wherein the set of guide pins are positioned to limit lateral movement of the can adjustment bar relative to the mounting plate.

9. The apparatus of claim 1, wherein the can adjustment bar includes a set of holes extending therethrough, the apparatus further including a set of coupling members each extending through a hole in the set of holes within the can adjustment bar.

10. The apparatus of claim 9, wherein the set of coupling members include bolts.

11. The apparatus of claim 1, wherein the can adjustment bar has a thickness approximately two times to approximately ten times a thickness of the mounting plate as measured along a primary axis of the set of guide pins.

12. The apparatus of claim 1, wherein the can adjustment bar and the mounting plate have respective primary axes parallel with one another, and wherein the can adjustment bar has a depth approximately two times to approximately five times a depth of the mounting plate as measured in a direction perpendicular to the primary axes of the can adjustment bar and the mounting plate.

13. The apparatus of claim 1, further comprising a set of bearings or bushings each located within the set of apertures in the can adjustment bar, the set of bearings or bushings permitting movement of the can adjustment bar along the set of guide pins.

14. A method of performing maintenance on a can combustor of a gas turbine (GT), the method comprising:

mounting a can combustor maintenance apparatus on the can combustor, the can combustor maintenance apparatus including:

a mounting plate having at least two fasteners extending through the mounting plate and a radially outer facing surface of a fixed combustion chamber, the mounting plate configured to engage the fixed combustion chamber in the GT;

a can adjustment bar configured to engage the can combustor, the can adjustment bar including a set of apertures extending therethrough;

a set of guide pins extending through the set of apertures in the can adjustment bar and coupled with the mounting plate, the set of guide pins connecting the mounting plate with the can adjustment bar; and an adjustment member extending between the can adjustment bar and the mounting plate; and actuating the adjustment member to modify a position of the can adjustment bar relative to the mounting plate;

actuating the adjustment member to modify a position of the can adjustment bar relative to the mounting plate.

15. The method of claim 14, wherein modifying the position of the can adjustment bar relative to the mounting plate moves the can combustor relative to the fixed combustion chamber.

16. The method of claim 14, wherein the adjustment member includes a jack bolt, wherein the can adjustment bar includes an internally threaded slot, the jack bolt extending through the internally threaded slot, wherein actuating the adjustment member includes rotating the jack bolt within the internally threaded slot and applying a force to the mounting plate to displace the can adjustment bar relative to the mounting plate.

17. The method of claim 14, wherein the at least two fasteners include adjustable set screws, wherein mounting the can combustor maintenance apparatus on the can combustor includes screwing the adjustable set screws up to or into the fixed combustion chamber.

18. The method of claim 14, wherein the set of guide pins limit lateral movement of the can adjustment bar relative to the mounting plate during the actuating.

19. The method of claim 14, wherein the can combustor maintenance apparatus further includes a set of bearings or bushings each located within the set of apertures in the can adjustment bar, the set of bearings or bushings permitting movement of the can adjustment bar along the set of guide pins during the actuating.

* * * * *